US007779134B1

(12) United States Patent  
DeLiberato et al.

(10) Patent No.: US 7,779,134 B1  
(45) Date of Patent: Aug. 17, 2010

(54) USING MODEM PROFILES TO IMPROVE CONNECTIVITY, CONNECT TIMING, AND COMPRESSION PERFORMANCE ON A MODEM RELAY (MR) GATEWAY

(75) Inventors: Daniel DeLiberato, Natick, MA (US); Alex Urquizo, Burlington, MA (US); Nathan Richmond Melhorn, Chelmsford, MA (US)

(73) Assignee: Cisco Technology, Inc., San Jose, CA (US)

(*) Notice: Subject to any disclaimer, the term of this patent is extended or adjusted under 35 U.S.C. 154(b) by 104 days.

(21) Appl. No.: 11/951,273

(22) Filed: Dec. 5, 2007

Related U.S. Application Data

(62) Division of application No. 10/376,208, filed on Feb. 25, 2003, now Pat. No. 7,324,533.

(51) Int. Cl.
   *H04L 12/28* (2006.01)
(52) U.S. Cl. .......................... 709/227; 370/401
(58) Field of Classification Search .............. 370/231, 370/230.1, 235, 401, 402, 477, 352–358, 370/389; 709/227, 228, 230, 237, 212, 231, 709/232, 238, 245
   See application file for complete search history.

(56) References Cited

U.S. PATENT DOCUMENTS

| | | |
|---|---|---|
| 5,131,016 A | 7/1992 | Broughton et al. |
| 5,170,394 A | 12/1992 | Biber et al. |
| 5,384,780 A | 1/1995 | Lomp et al. |
| 5,438,614 A | 8/1995 | Rozman et al. |
| 5,617,423 A | 4/1997 | Li et al. |
| 5,710,761 A | 1/1998 | Scott |
| 5,751,701 A | 5/1998 | Lanberg et al. |
| 5,754,589 A | 5/1998 | Miatra et al. |
| 5,781,726 A | 7/1998 | Pereira |

(Continued)

FOREIGN PATENT DOCUMENTS

AU    2003275107    3/2005

(Continued)

OTHER PUBLICATIONS

International Search Report for PCT/US03/29806; Date of mailing Feb. 24, 2004.

(Continued)

*Primary Examiner*—Brenda Pham  
(74) *Attorney, Agent, or Firm*—Stolowitz Ford Cowger LLP

(57) ABSTRACT

Cached or predictive negotiation of compression parameters over a modem relay network connection involves method and apparatus for determining at a gateway the identity of a client/server modem that is called or calling, and using a profile of such called or calling client/server modem, the profile being stored at the gateway or an affiliated agent, to transmit respectively a candidate response or command containing compression parameters. Preferably, a candidate response or command includes an exchange identification (XID) or link request (LR) command or response, either provisioned, i.e. manually configured or automated, i.e. computer-generated. The profile is stored in a memory. The actual achieved parameters for a given call also may be stored, e.g dynamic learning may be had. Finally, establishing such profiles by placing dummy calls once the modem's phone number is known also is described as a feature of the invention.

19 Claims, 5 Drawing Sheets

U.S. PATENT DOCUMENTS

| | | | |
|---|---|---|---|
| 5,852,631 | A | 12/1998 | Scott |
| 6,292,840 | B1 | 9/2001 | Blomfield-Brown et al. |
| 6,324,409 | B1 | 11/2001 | Shaffer et al. |
| 6,449,269 | B1 | 9/2002 | Edholm |
| 6,487,196 | B1 | 11/2002 | Verthein et al. |
| 6,504,838 | B1 | 1/2003 | Kwan |
| 6,542,504 | B1 | 4/2003 | Mahler et al. |
| 6,603,774 | B1 | 8/2003 | Knappe et al. |
| 6,671,367 | B1 | 12/2003 | Graf et al. |
| 6,757,250 | B1 * | 6/2004 | Fayad et al. .............. 370/235.1 |
| 6,757,367 | B1 | 6/2004 | Nicol |
| 6,865,220 | B2 | 3/2005 | Abrishami |
| 6,882,711 | B1 | 4/2005 | Nicol |
| 6,898,181 | B1 | 5/2005 | Rasanen |
| 7,075,979 | B2 | 7/2006 | Beadle et al. |
| 7,113,501 | B2 | 9/2006 | Garakani et al. |
| 7,126,711 | B2 | 10/2006 | Fruth |
| 7,177,944 | B1 * | 2/2007 | Chen et al. ................. 709/237 |
| 7,203,226 | B1 | 4/2007 | Rabipour et al. |
| 7,299,295 | B1 | 11/2007 | Garakani et al. |
| 7,324,533 | B1 | 1/2008 | DeLiberato |
| 7,382,730 | B2 * | 6/2008 | Garakani et al. ............ 370/236 |
| 7,420,960 | B2 * | 9/2008 | Somekh et al. ............ 370/352 |
| 7,489,633 | B2 * | 2/2009 | Garakani et al. ............ 370/231 |
| 7,590,132 | B2 | 9/2009 | Melhorn |
| 2002/0064168 | A1 | 5/2002 | Garakani et al. |
| 2002/0145993 | A1 | 10/2002 | Chowdhury et al. |
| 2003/0123466 | A1 | 7/2003 | Somekh et al. |
| 2004/0059823 | A1 | 3/2004 | Garakani et al. |

FOREIGN PATENT DOCUMENTS

| | | |
|---|---|---|
| CA | 2500023 | 9/2003 |
| CA | 2541808 | 10/2004 |
| CN | 200480029275.2 | 10/2004 |
| CN | 3822698.7 | 3/2005 |
| EP | 1047231 | 10/2000 |
| EP | 1209853 | 5/2002 |
| EP | 4794470.7 | 10/2004 |
| EP | 2003759378 | 3/2005 |
| WO | WO 01-01654 | 1/2001 |
| WO | PCT/US03/029806 | 9/2003 |
| WO | PCT/US04/033129 | 10/2004 |

OTHER PUBLICATIONS

ITU V.42; Error-Correcting Procedures for DECS Using Asynchronous-to-Synchronous Conversion; 59 pages; Apr. 2002.

Stolowitz Ford Cowger, Listing of Related Cases, Jan. 19, 2010.

International Telecommunications Union; "Series V: Data Communication Over the Telephone Network"; Feb. 1998; Version 8.

Written Opinion of the International Searching Authority for PCT/U2004/033129; Feb. 4, 2005.

International Preliminary Report on Patentability for PCT/U2004/033129; Feb. 4, 2005.

PCT Search Report for PCT/US03/029806; mailed Feb. 24, 2004.

PCT Search Report for PCT/US04/033129; mailed Feb. 8, 2005.

ITU-T (Telecommunication Standardization Sector of ITU) V.150.1 Series V: Data Communication Over the Telephone Network, Interworking with other networks, Procedures for the end-to-end connection of V-series DCEs over an IP network (Jan. 2003).

ITU-T Recommendation V.44 (formerly CCITT Recommendation) Series V: Data Communication Over the Telephone Network, Error Control, Data Compression Procedures (Nov. 2000).

ITU CCITT V.42bis Data Communication Over the Telephone Network; Data Compression Procedures for Data Circuit Terminating Equipment (DCE) Using Error Correction Procedures (Geneva, 1990).

Stolowitz Ford Cowger, Listing of Related Cases, Jan. 26, 2010.

* cited by examiner

USING MODEM PROFILES TO IMPROVE CONNECTIVITY, CONNECT TIMING, AND COMPRESSION PERFORMANCE ON A MODEM RELAY (MR) GATEWAY

The present application is a divisional of Ser. No. 10/376,208, filed Feb. 25, 2003, which is incorporated in its entirety.

BACKGROUND OF THE INVENTION

The present invention generally relates to connectivity and performance improvements in modem relay (MR) network links. More particularly, it concerns modem relay (e.g. MR1) gateways and cached or predictive compression parameter negotiation.

The Modem Relay (MR) MR1 connection scenario (no transcompression, formerly called Type 2a) requires a first, originating modem M1 and a second, terminating modem M2 to negotiate identical compression parameters. To obtain optimal compression parameters requires end-to-end eXchange IDentification (XID) negotiation. Since XID negotiation starts with a frame from the originating modem (M1), the MR gateways need to be certain that G2<=>M2 physical connection is complete before that of M1<=>G1. In this way, G2 can forward M1's XIDc to M2 as soon as it is available, and similarly to return M2's XIDr to M1. In order to do this, a number of ideas have been provided to either delay completion of the physical connection on G1 until the physical connection on G2 is complete, or to perform XID transactions more than once, which repetition might not be expected by some server modems.

Alternatively, both gateways may decide locally to negotiate a small "default" subset of compression parameters, in order to avoid end-to-end problems. In this case, the default may be too small, giving lower compression performance than end-to-end negotiation could have achieved. Or, the default may not be small enough (e.g. one modem is actually configured for no compression), resulting in infeasible compression settings. Furthermore, this process will add to the time required to reach data mode in modem relay (MR) connections, which frustrates users waiting to get on the Internet.

Many of these techniques may be prone to systematic failures. Furthermore, this process will add to the time required to fully connect in modem relay (MR) mode, which frustrates users waiting to get on the Internet. Because of this timing issue, many gateway implementations simply use 'local minimal' default compression parameters (e.g., dictionary size=1K (where K=$2^{10}$), string size=32) to avoid a delay in the physical connection. This heuristic often results in sub-optimal compression parameters. Worse, it may occasionally fail to connect if either M1 or M2 is configured for narrower compression parameters than the minimal choice (e.g. no compression at all).

SUMMARY OF THE INVENTION

Cached or predictive negotiation of compression parameters over a modem relay network connection involves method and apparatus for determining at a gateway the identity of a client/server modem that is called or calling, and using a profile of such called or calling client/server modem, the profile being stored at the gateway or an affiliated agent, to transmit respectively a candidate response or command containing compression parameters. Preferably, a candidate response or command includes an exchange identification (XID) or link request (LR) command or response, either provisioned, i.e. manually configured or automated, i.e. computer-generated. The profile is stored in a memory. The actual achieved parameters for a given call also may be stored, e.g. dynamic learning may be had. Finally, establishing such profiles by placing dummy calls once the modem's phone number is known also is described as a feature of the invention.

DETAILED DESCRIPTION OF THE INVENTION

Some definitions first are supplied:

M1<=>G1<=>G2<=>M2

M1: calling/originating modem, often part of a client computer system.

GW: gateway

M2: answering/called/terminating modem, often part of a server computer system.

OGW, G1: ingress/originating modem relay (MR) gateway.

TGW, G2: egress/terminating MR gateway.

x<=>y: connection between system x and y

M1<=>G1, G2<=>M2: these connections are dialup via PSTN, using modem modulations and protocols.

G1<=>G2: this connection is via a packet network, using V.MoIP MR gateway protocols.

XIDc: Link Access Protocol for Modems (LAPM) XID command.

XIDr: LAPM XID response.

XIDpc: an XID configuration or "profile", describing how it behaves during XID negotiation, for a calling (originating) modem.

XIDpr: an XID configuration or "profile", describing how it behaves during XID negotiations, for a called (terminating) modem.

XIDd: a "default" profile for a modem. This would commonly be used to define a small enough set of parameters to cover nearly all M1/M2 factory default compression capabilities for most manufacturers.

∩: "negotiated with." E.g. Capability∩Capability yields an XID.

⊆: "is a negotiation subset of." E.g. Capability1⊆Capability2.

≦: "properly negotiates down to." E.g. XIDr≦XIDp.

Trans-compression types of MR connections can benefit greatly from consistent end-to-end compression parameters, in that the trans-compressors could drop out, thus conserving gateway resources. End-to-end compression parameters are a good thing to have. The problem is that, conventionally, client modems' compression parameters are discovered very late in the connection process, and it may be problematic to exchange these parameters in real time across the IP network. These problems are addressed by the present invention, to be described.

Figure 1:
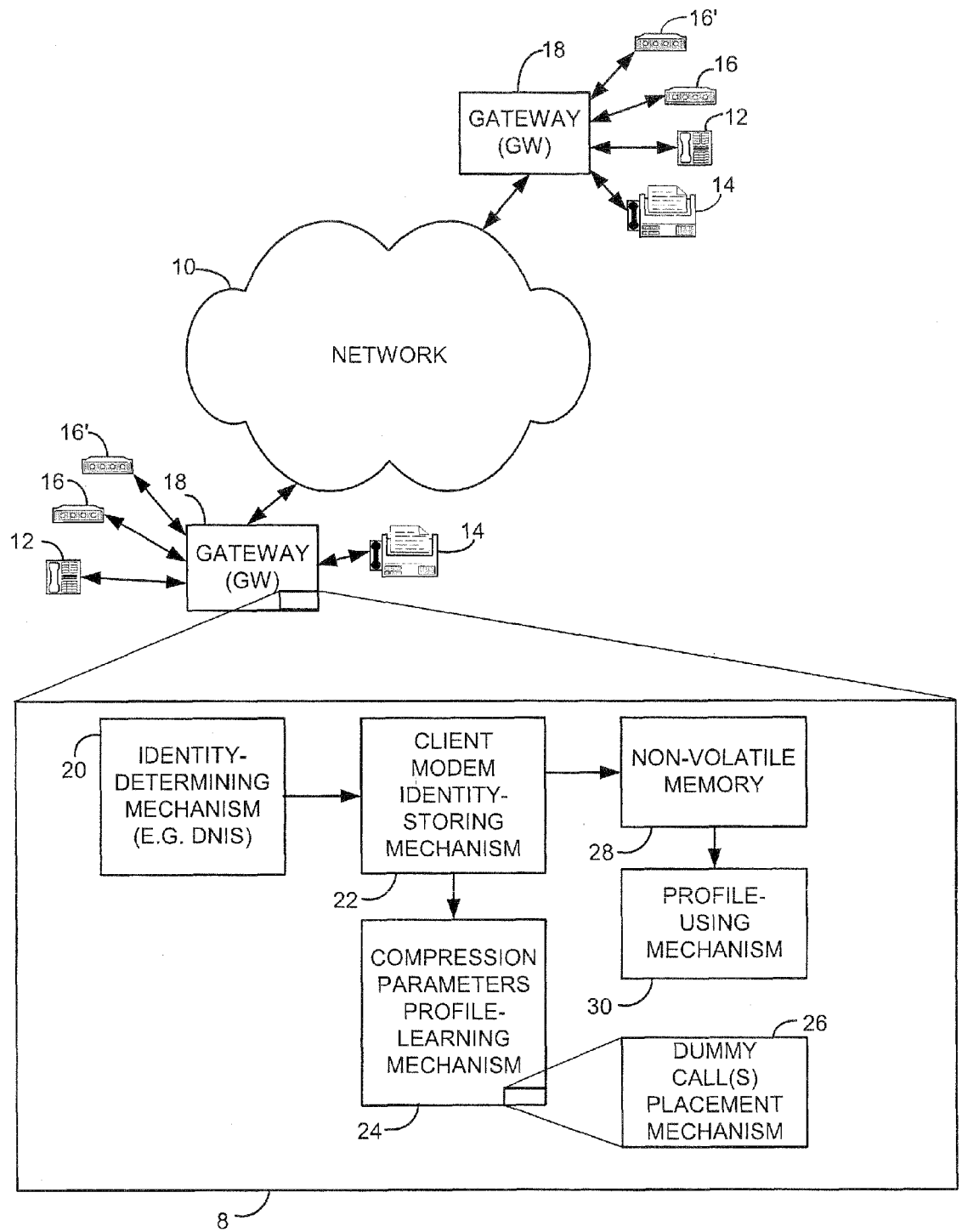
FIG. 1 is a system block diagram illustrating a VoIP network in which the XID profile exchange apparatus is featured in accordance with a preferred embodiment of the invention.

FIG. 1 illustrates the invented apparatus 8 coupled with a network 10 operating with respect to voice traffic thereon in accordance with a voice packet protocol such as a voice over frame relay (VoFR) protocol or voice over Internet protocol (VoIP). Network 10 typically includes one or more telephone handsets 12, one or more fax machines 14 and one or more low-speed modems 16 representing different traffic demands on network 10 due to their diverse bandwidth requirements. The faxes 14 and low-speed modems 16 often share telephone numbers with the telephone handsets to provide facsimile, e-mail and Internet service to users/clients. High-speed (i.e. V.34 and higher) modems 16' are typically provided, and are the type of high-speed modems with which the invention finds particular utility.

Handsets 12 communicating voice require relatively low bit rates over the IP network. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation.

In a voice frame network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, VoIP channels using Real-time Transfer Protocol (RTP) or other low-latency protocols represent an unreliable transport for high-speed signaling between high-speed modems 16'. Conventionally, in a VoIP network 10, high-speed modems 16' would have negotiated an end-to-end physical layer, e.g. V.34, and gateways 18 would have been 'passive enablers' (i.e. operating in so-called Modem Passthru mode) of the resulting voice mode VoIP connection that is subject to network impairments (e.g. packet drops, jitter, delay) that could result in frequent retrains and/or call drops.

Compression parameters should be established as early as possible to achieve the highest connectivity, fastest connect time and highest performance. But as mentioned above, in conventional MoIP connections, compression parameter negotiation occurs late in the relay connection setup because it is the last phase of call setup. Negotiating compression parameters occurs under inconvenient circumstances, e.g. when all differential timing has accumulated, so that the compression negotiation phases may not occur close enough in time at the two ends. This is primarily due to the coupled nature, e.g. wait and response, of the bring-up of the physical layers. Also, end-to-end negotiation takes time to perform, which costs traditional MR time to connect.

The base mode of operation for V.MoIP (MR1 connections) involves using default compression parameters. These default parameters (due to a need to account for the vast majority of client types) are not optimized for performance. Enhancements to V.MoIP (end-to-end compression parameter negotiation) are available that try to optimize compression performance, but at the cost of complexity and connection time. The use of profiles of compression parameters eliminates the need to negotiate end to end but sill optimizes the compression performance in many circumstances.

Thus, the solution to the problem described immediately above is to have the MR originating gateway (OGW) and terminating gateway (TGW) predict the XID command sent by the calling modem and to predict the XID response thereto sent by the called modem. In this way, the OGW and TGW are able to agree on an optimal and consistent LAPM XID command (XIDc) and response (XIDr) that each will send when the particular physical connection comes up. Those of skill in the art will appreciate that either of gateways 18 and their associated modems 16' may act in a given application as an originating gateway (OGW) with its associated modem M1 or a terminating gateway (TGW) with its associated modem M2, to be described operationally in detail below.

The invention proposes to configure an MR gateway with the XID profiles for each of its common directly-connected users. When an MR call is made by client modem M1, G1 can identify which modem made the call using dialed number identification service (DNIS) or other suitable methods. Of course, G2 knows the number it is about to call, and thus the client modem involved. These client modems are the direct users. This configuration allows the GW to know the calling/called number's XID profile early in the call, before the conventional XID negotiation phase. The connectivity and connect time advantages will be understood by those of skill in the art.

The prediction can be different for each calling and called modem, depending upon that modem's capabilities and how it is configured. The gateway can identify the particular modem by using PSTN calling/called number identification facilities of the equivalent. During a call, if prediction information is available for the calling and/or called modems, the gateways will use this information to optimize the connection process. Presumably, an OGW has more knowledge of its various calling modems, and a TGW has more knowledge of its various called modems. This invention assumes that the knowledge is localized in this manner, so OGW knows and sends calling modem predictive information, and TGW knows and sends called modem predictive information.

Thus, for gateways implementing the present invention:
G1 knows beforehand the XIDc that M1 will send.
G2 knows beforehand the XIDr that M2 will reply to an arbitrary XIDc. The gateways interchange sufficient information to predict the XID exchanges that will take place on both the originating and terminating legs. This information is referred to herein as:

XIDpc[M1]: prediction data for the XIDc sent by M1, or M1's "XID profile."

XIDpr[M2]: prediction data for the XIDr sent by M2 to an arbitrary XIDc, or M2's "XID profile."

XIDpc Information

It is sufficient for XIDpc[M1] to be the XIDc string sent by M1, plus M1's protocol capabilities (used to predict V.44 vs. MNP5). That is because M1 is the first 'speaker' during XID exchange. This information contains:

A list of link layer protocols supported: LAPM, MNP, V.14, "sync."

Optional V.42bis parameters: directions, dictionary size and string size, used if M1 negotiates either LAPM or MNP protocols.

Optional V.44 parameters: compression directions, renegotiation capability, Rx/Tx max dictionary size, Rx/Tx max string size and Rx/Tx max history size, used if M1 negotiates LAPM protocol.

Optional "MNP5-supported" field, used if M1 negotiates MNP protocol.

If M1 is configured for MNP-only protocol operation, or if M1 falls back to MNP due to a failure of the ODP/ADP or XID exchange, then the LR contents have an equivalent XID string, as far as compression capabilities are concerned. If M1 is configured for no-protocol operation, then XIDpc[M1] will be null, indicating that compression cannot be performed. MNP (without a suffix) herein refers to the MNP error correcting protocol levels: MNP1, MNP2 and MNP3. (MNP4 is simply an enhancement of MNP2 or MNP3; any of these protocols can support MNP5 or V.42bis compression).

XIDpr Information

XIDpr[M2] is more difficult to codify, since M2's XIDr is dependent upon the XIDc it receives and an XIDr will never specify multiple compressions. M2 may, within the spirit and scope of the invention, implement a complex negotiation function such as "choose the feasible protocol with the larger resulting dictionary." Alternatively, and in accordance with a preferred embodiment of the invention, a simpler implementation prioritizes among compression alternatives, e.g. "V.44 is better than V.42bis is better than MNP5."

Those of skill in the art will appreciate that XIDpr[M2] represents the XIDc string that M2 would send if it were originating a call, plus the priority ordering M2 gives to the various compressions. Copying from XIDpc[M1] above, then, XIDpr[M2] is:

A list of link layer protocols supported: LAPM, MNP, V.14, "sync."

Optional V.42bis parameters: directions, dictionary size and string size, used if M1 negotiates either LAPM or MNP protocols.

Optional V.44 parameters: compression directions, renegotiation capability, Rx/Tx max dictionary size, Rx/Tx max string size and Rx/Tx max history size, used if M1 negotiates LAPM protocol.

Optional "MNP5-supported" field, used if M1 negotiates MNP protocol.

An ordered list of the compressions above, e.g. "V.44, V.42bis, MNP5", in priority order.

The Structure of the XIDp Data

The profile is sent as a series of records: <item ID>><length-of-body><body>, preferably as follows:

V.42bis: 0x01<length><Cpriority><contents of XID's V.42bis group>

V.44: 0x02<length><Cpriority><contents of XID's V.44 group>

MNP5: 0x03<length><Cpriority>

LAPM: 0x04<length=1><Cpriority>

MNP: 0x05<length=2><Ppriority><MNP1: 1; MNP2: 2; MNP3: 3>

V.14: 0x06<length=3><PXSpriority><bits/char><parity type>

SYNC: 0x07<length><priority><body—TBD>

Modulation Map: 0x08<length><bitmap of modulations—TBD>

The "Cpriority" field indicates which compression scheme is preferred if several are supported. Normally, V.44>V.42bis>MNP5. The "Ppriority" field indicates which protocol is preferred if several are supported. Normally, LAPM>MNP>V.14. If <length> is zero, then the compressions method (etc.) is not supported at all by the particular modem. If the record for that method is not present, then the gateway does not (yet) know whether the scheme is supported. The compression parameters are coded as the actual XID group that would be sent in an XIDc or XIDr. In the case of MNP, the implementation is expected to translate XID into LR format and back. Finally, the SYNC protocol and the modulation map are intended to support future useful extensions of the invention. If it is useful, for example, to have early knowledge of these items, then they can be stored as part of the profile.

An XID_PROF SPRT message preferably is used to payload the XIDp data described above, although alternate forms of messaging between gateways are contemplated as being within the spirit and scope of the invention. Indeed, within the spirit and scope of the invention, alternative XIDp data structure, content and/or order are contemplated. For example, fields may be omitted or supplemented, may be of fixed length and may choose to use a priori priorities (e.g. V.44>V.42bis>MNP5; LAPM>MNP2, 3, 4>V.14, as in the draft ITU-T V.150.1 standard).

How the Gateways Use the Exchanged Information

Figure 2:
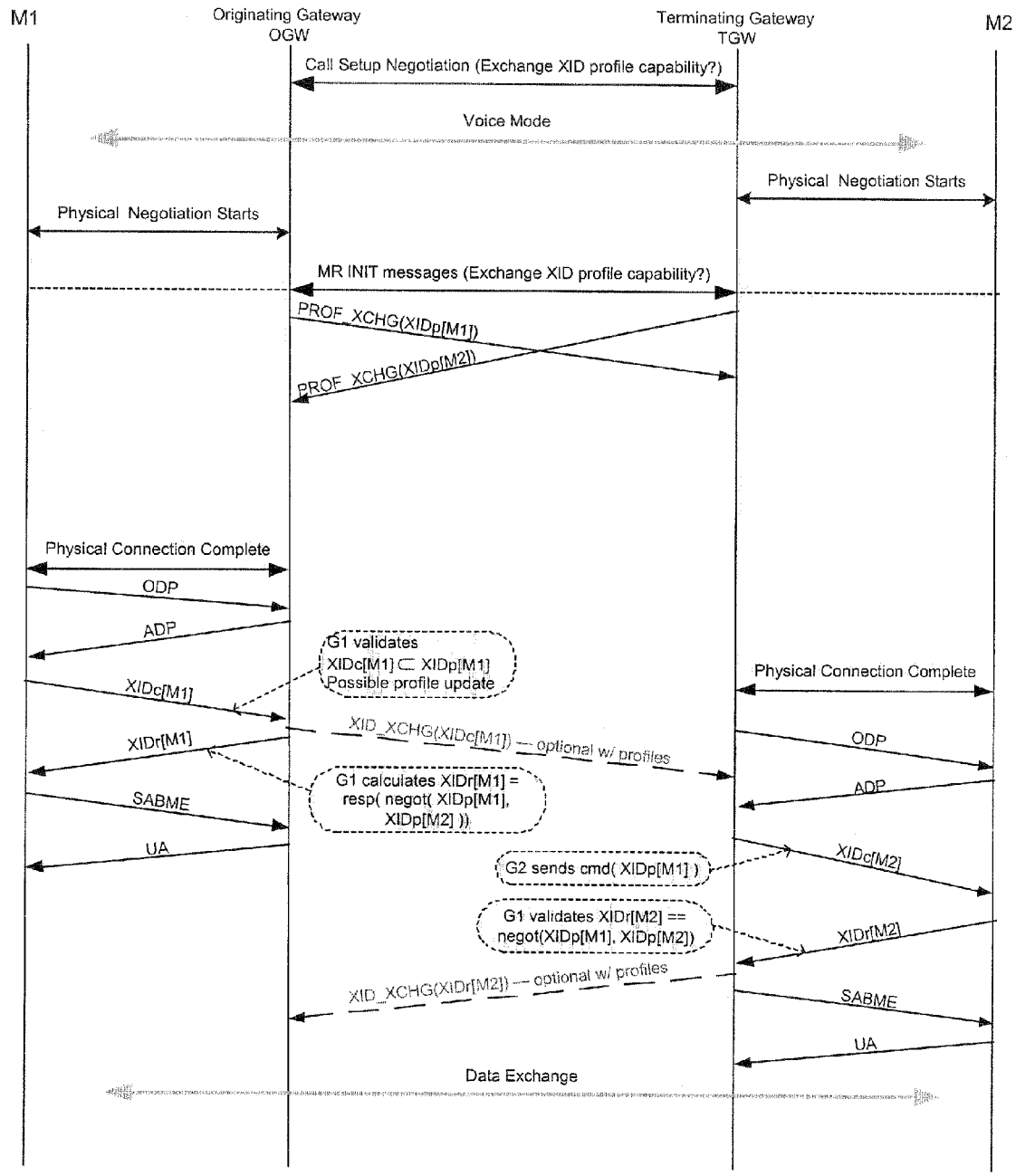
FIG. 2 is a flow diagram of the XID profile exchange method in accordance with a preferred embodiment of the invention.

FIG. 2 is a flow diagram illustrating the preferred bilateral XID profile exchange method in accordance with an embodiment of the invention. FIG. 2 may be seen to describe transaction flow between a modem M1 and its associated originating gateway OGW, between a modem M2 and its associated terminating gateway TGW and between the two gateways OGW and TGW. Those of skill in the art will appreciate that time progresses down a vertical axis, from the first possible instance of call setup negotiation, through Voice Mode, physical layer negotiations, modem relay initialization, predictive profile exchange and validation and, finally, data exchange at resulting optimal or nearly optimal efficiency in a time-reduced set up that is made possible by the invention.

The detailed physical layer negotiation and ODP/ADP exchanges, XIDc/XTDr exchanges and SABME/UA exchanges are conventional and will not be described further herein. The profile exchanges and validations represented in the bulk of the middle section of FIG. 2 will be described in detail below under the heading OPERATION WHEN BOTH GATEWAYS SUPPORT THE PROCEDURE. Those of skill in the art will note that the partial implementations described below represent a subset of the transactions illustrated comprehensively in FIG. 2, and will be described further by reference to FIGS. 3-5.

Those of skill in the art will appreciate that the XID negotiation rules require:

XIDr[OGW→M1] ⊆ XIDc[M1→OGW]
XIDr[M2→TGW] ⊆ XIDc[TGW→M2]
XIDc[M1→OGW]=XIDpc[M1]
XIDr[M2→TGW]=XIDc[TGW→M2]∩XIDpr[M2],

Wherein ⊆ means "has less or equal compression capability than" and wherein ∩ is the compression negotiation operator. The following thus is sufficient for feasible negotiation:

XIDc[TGW→M2]=XIDr[M2→TGW]=XIDr [OGW→M1]

These values can be calculated from the exchanged XIDp information as follows:

XIDresult:=XIDpc[M1]∩XIDpr[M2]
XIDc[TGW→M2]:=XIDr[M2→TGW]:=XIDr [OGW→M1]:=XIDresult Those of skill in the art will appreciate that these values satisfy the negotiation rules above. It is also noted that XIDresult is an optimal end-to-end value.

The "∩" negotiation operator (analogous to the Boolean AND operator) has the following format: XIDresult=XIDpc [M1]∩XIDpr[M2], and simply performs the compression negotiation function specified in V.42, V.42bis and MNP:

presumably the gateway can handle all link layer protocols: LAPM, MNP and V.14 (leaving "sync" out of the picture). Again, presumably the gateway will choose LAPM over MNP, or over V.14. The gateways assume that the highest available link layer protocol for that profile is chosen. The protocol choice limits the compression capabilities: If LAPM is chosen, then V.44 and V.42bis compression will be available. If MNP is chosen, then V.42bis and MNP5 will be available. Otherwise (V.14 or "sync"), no compression will be available.

The highest priority common compression is chosen. If there are no common compressions, then "no compression" is the result.

For V.44 or V.42bis, where unidirectional or bi-directional compression can be declared, the two directions are minimized. For each direction, then, compression is enabled only if the sender can compress and the receiver can decompress. For MNP5, both directions are always available.

For V.42bis and V.44, the arithmetic minimum of M1/M2's dictionary sizes is chosen. For V.42bis, only a single dictionary size exists, which is used in both directions. For V.44, there are separate sizes for the two directions.

For V.42bis and V.44, the arithmetic minimum of M1/M2's string sizes also is chosen. For V.42bis, only a single string size exists, which is used in both directions. For V.44, there are separate sizes for the two directions.

For V.44, the arithmetic minimum of M1/M2's history sizes is chosen, and there are separate sizes for the two directions.

Operation when Both Gateways Support the Procedure

For operation when both gateways support the procedure, the gateways send the appropriate profile as soon as MR is connected. The profile is conveyed in an SPRT PROF_XCHG message. This profile arrives very early during modulation train-up. The phone number—DNIS for OGW, called# for TGW—is available for MR use from the gateway's voice call management information.

After this profile exchange, each gateway has XID profiles for both the called and calling modems. As soon as M1 sends its XIDc, the OGW can calculate the appropriate XIDr and return it immediately—there is no need to wait for a TGW train-up and exchange. As soon as M2 trains up, the TGW sends the appropriate XIDc—there is no need to wait for an OGW train-up.

Those of skill in the art will appreciate that, if there is no stored XID profile for a particular phone number, that gateway will not be able to send a populated PROF_XCHG message. On the other hand, it will be able to take advantage of the PROF_XCHG message sent from the other gateway. Moreover, as described below, a called gateway (i.e. TGW) may poll its client modem, or await a normal XIDr therefrom, and store the response for later use in accordance with the dynamic learning aspect of the invention.

Operation when Only the OGW Supports the Procedure

If the TGW does not support end-to-end XID profile exchange, then the OGW can still immediately send a predicted XIDc to the TGW in the XID_XCHG message, without awaiting M1-OGW train-up. If M1-OGW train-up completes later than the TGW-M2 train-up, then the TGW-M2 session need not await the arrival of an end-to-end XIDc, but instead can immediately proceed to negotiate compression parameters.

For end-to-end negotiations to complete, M2's XIDr must be returned to the OGW to be relayed to M1 when it trains up.

Operation when Only the TGW Supports the Procedure

If the OGW does not support end-to-end XID profile exchange, then the TGW can still send the predicted XIDr to the OGW in the XID_XCHG message as soon as it receives XID_XCHG(XIDc) from the OGW, without having to await TGW-M2 train-up. If the TGW-M2 train-up completes later than the M1-OGW train-up, then the OGW-M1 session need not await arrival of an end-to-end XIDr, but instead can immediately proceed to negotiate.

To calculate the appropriate XIDr, the TGW performs the "ANDing" negotiation function between the incoming XIDc and its stored XID profile. This ANDing function will be understood by those of skill in the art to be alternatively described herein using the ∩ symbol, which will be understood to represent "negotiated with."

Summarizing one embodiment of the invention, those of skill in the art will appreciate that the invention involves decoupling the XID phases for M1-G1 and M2-G2. In other words, when the gateways start to set up an MR call, the XID profiles are exchanged if both gateways support XID profiles. The profiles can be exchanged out-of-band using an appropriate signaling mechanism (e.g., H.245, session description protocol (SDP)) or in-band using a V.MoIP transport protocol (e.g., single packet relay transport (SPRT)).

The gateways can thus calculate the negotiation result early.

When M1 finally sends its XIDc, OGW replies immediately with the calculated XIDr=XIDc∩XIDp[M2], even if M2 hasn't yet sent its XIDr.

When M2 reaches XID phase, TGW immediately sends the calculated XIDc=XIDp[M1], and then receives the (hopefully) expected XIDr.

It is possible to detect mis/reconfiguration of M1 or M2 if the received XIDc[M1]≠XIDp[M1] or the received XIDr [M2]≠XIDc[M2] & XIDp[M2]. If this occurs, the appropriate gateway's XIDp vs. DNIS database must be updated. The call has failed if the XIDr[M1] sent by OGW is not the same as the XIDr[M2] received by TGW, accounting for default settings, though some implementations may choose always to fail the call.

The two XID exchanges (M1-OGW, TGW-M2) don't need to be physically synchronized with each other and there is no restriction as to which leg needs to complete the physical layer negotiation first.

Another embodiment of the invention involves so-called partial implementation whereby one but not both of the gateways supports profiling.

If only one gateway supports modem profiles, there are still advantages:

TGW only: When OGW reports the "real" XIDc[M1], TGW can reply immediately with XIDr[M2], even if M2 has not yet finished XID exchange. Such a report and reply would be via an MR XCHG_XID.

OGW only: When TGW finishes train-up, it can send XIDc [M1], even if M1 has not yet sent XIDc.

Yet a third embodiment of the invention involves profile discovery.

If an XID profile does not exist for a particular calling/ called user, a learn-on-the-fly approach can be followed. In this case, the profile for this particular connection is stored/ saved based on the command/response sent by M1/M2 respectively.

A single XIDc from M1 is sufficient to populate OGW's profile database.

For M2/TGW, however, only a feasible set of parameters is learned rather than a complete or optimal profile. To maximize the chance of connection, only a small default set of parameters is required.

This approach seems to defeat some of the advantages of modem profiling, since it is little if any better than XIDd-based default parameter exchange.

Accordingly, in some applications, it may be acceptable to take the time to place a first call the purpose of which is to elicit an XID profile from the terminating leg, i.e. to place a dummy call or to send a probe. Thus, a reasonable set of parameters can be requested in the XIDc, and a fairly complete profile may be obtained. It will be known whether M2 can negotiate V.42bis, and if so then a reasonable dictionary size can be specified. V.44 capability at this time will be unknown.

The OGW end-to-end XIDc probing value will be even better if the M1-OGW session comes up first.

This profile can be refined or improved only at the risk of losing calls (because an XIDc probe would need to be sent that was 'larger' than M2's known capability. If M2 should accept a larger value than M1 sends or receives, then negotiation will have failed). If end-to-end XID exchange is infeasible due to timing, then local values must be used.

A more active profile discovery inventive embodiment is possible, illustrating yet another aspect of the invention.

TGW or an agent (connected server, etc.) can "learn" M2's complete profile by attempting a number of dummy calls after the DNIS has been used for the first time. One call would send XIDc with maximal V.42bis parameters (both, 64K dictionary; 250 string). The response would be the V.42bis profile. Another call would send XIDc with maximal V.44 parameters (both, 64K dictionaries; 255 strings, 64K histories), thus discovering the V.44 profile of answering modem M2. A third call would request both V.42bis and V.44 compression, and the result would indicate M2's compression preference. Further refinements are contemplated as being within the spirit and scope of the invention.

A network manager can also manually enter M2's profile into a database for use by TGW.

An important aspect of the invention is the how and where of profile storage, illustrating yet another aspect of the invention.

Simple caching of learned modem profiles has the problem of volatility—if the gateway is power cycled, cache data will be lost.

When an MR GW learns the XIDp for a particular DNIS, it should save the profile in non-volatile storage, either on the gateway or on an affiliated agent, e.g. an external server (e.g. Gatekeeper, Radius, etc.). The profiles may be totally reloaded back into the gateway after a power cycle, or the gateway may query the server for profile information on a per-call basis, using the calling/called phone number as a key.

An external profile server also offers storage of profile information for all the ports on all the gateways at a site, and not merely for the ports that happen to have served the calling/called number in the past.

Those of skill in the art will appreciate that the same invented technique would work as well with Microcom networking protocol (MNP) as with V.42, saving link requests (LRp's) instead of XIDp's. The two compression types supported by an MNP modem are V.42bis and MNP5. Thus, it will be appreciated that "profile" as used herein has the broadest possible meaning and may refer to XIDs, link requests or other protocol and performance-related information regarding a called or calling modem's characteristic configuration or preference.

Finally, this same invented profile technique could be used to know a priori whether the particular modem would negotiate V.42, MNP or V.14 connections. Since protocol fallback is problematic and causes longer delays, protocol selection itself would be improved. The modem profile vs. DNIS database would then include the selected protocol. Either automatic discovery or manual configuration could be used, and this choice might be separate from the manual/discovery setting for data compression. Thus, yet another aspect of the invention involves connection-type profiling using predictive, preferably non-volatile storage and look-up techniques.

Referring again now briefly to FIG. 1, the invented apparatus 8 may be described. Apparatus 8 includes an identity-determining mechanism, e.g. a DNIS mechanism, 20; a client modem-identity-storing mechanism 22; and a mechanism 24 for learning the compression parameters profile for the client modem. Those of skill in the art will appreciate that learning mechanism 24 preferably includes a mechanism 26 for placing one or more dummy calls, e.g. as many dummy calls as are needed to complete a client modem profile, as described above. Apparatus 8 also includes a preferably non-volatile storage device such as a memory 28 and a mechanism 30 for using memory-based client modem profiles to shorten and improve the compression parameters negotiation process, as described. Such mechanisms as are shown in FIG. 1 will be understood by those of skill in the art preferably to be implemented in gateway 18-resident software, in accordance with a preferred embodiment of the invention.

Those of skill in the art will appreciate that the invented method in its simplest and most elegant form may be described as a method for negotiating compression parameters over an MR network connection involving a) determining at a gateway the identity of a client modem that is called or calling and b) using a stored profile of such called or calling client modem to transmit respectively a candidate response or command containing preferably performance-maximizing compression parameters for later validation and use in the MR connection. Such is described herein above in great detail. Various alternatives or amplifications on this generic approach are illustrated in FIGS. 3-5 and will be described below.

Figure 3:
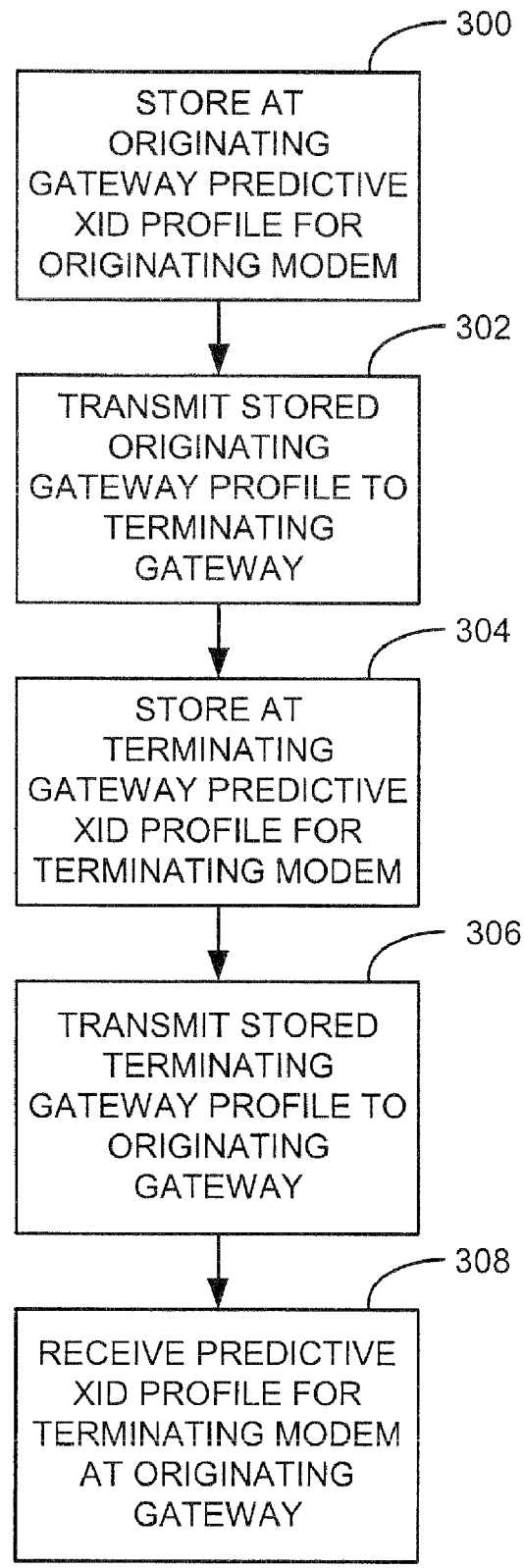
FIG. 3 is a flowchart of the invented method in accordance with a preferred embodiment of the invention.

FIG. 3 is a flowchart illustrating a first preferred method for end-to-end prediction of compression parameters over an MR network having two modems and associated originating and terminating gateways. The method includes at 300 storing a predictive XID profile for an originating modem at the originating gateway. At 302, the stored originating gateway profile is transmitted to the terminating gateway. At 304 and 306, the same store and transmit steps are preferably repeated for the terminating gateway profile. Finally, at 308, the predictive XID profile for the terminating gateway is received at the originating gateway. Optionally, of course, and as illustrated in FIG. 2 but not shown in FIG. 3, the predictive XID profile for the originating gateway also is received at the terminating gateway. This last optional step assumes that both gateways are equipped to do predictive profiling, as described above.

Figure 4:
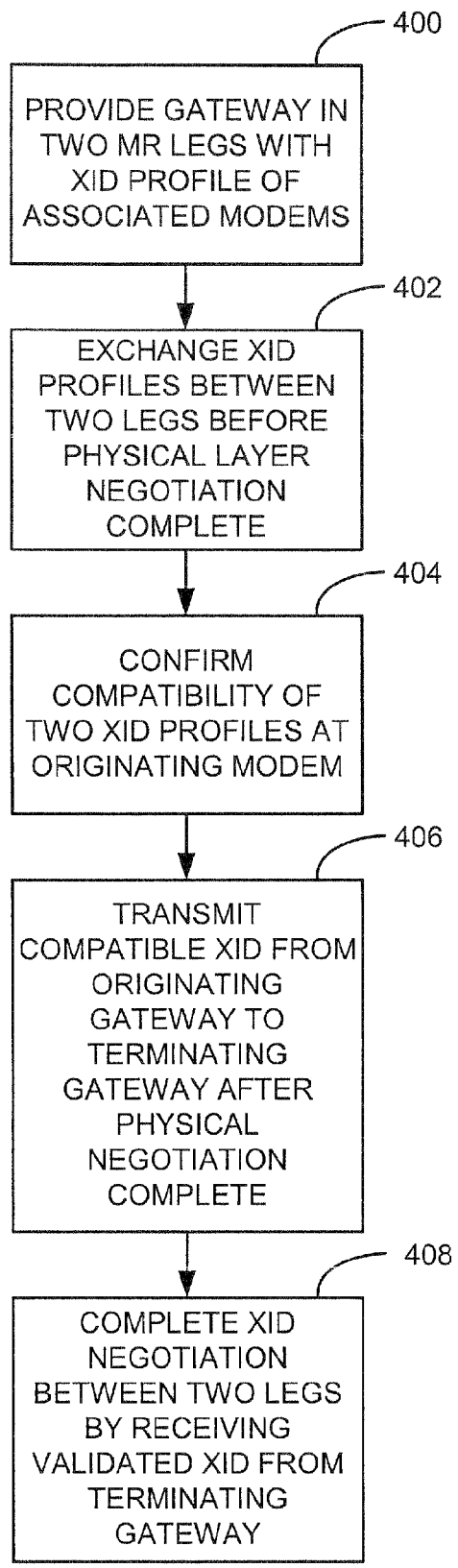
FIG. 4 is a flowchart of the invented method in accordance with another preferred embodiment of the invention.

FIG. 4 is a flowchart illustrating a preferred method for decoupling the XID phases of two modem-gateway legs of an MR connection. The method includes at 400 providing a gateway in each of two MR legs with an XID profile of the two gateways' associated modems. At 402, XID profiles are exchanged between the two legs. Typically, such is done before the physical layer negotiation on at least one leg is complete. At 404, compatibility of the two XID profiles is "confirmed" at the originating modem, i.e. XIDr is accepted or not. The OGW calculates the optimal compression settings, i.e. XIDr=XIDp[M1]∩XIDp[M2]. At 406, a compatible XID is transmitted from the originating gateway to the terminating gateway. Typically, such is done after physical layer negotiation is complete. Finally, at 408, XID negotiation between the two legs is completed when the originating gateway receives a validated XID from the terminating gateway, as described in detail above.

Figure 5:
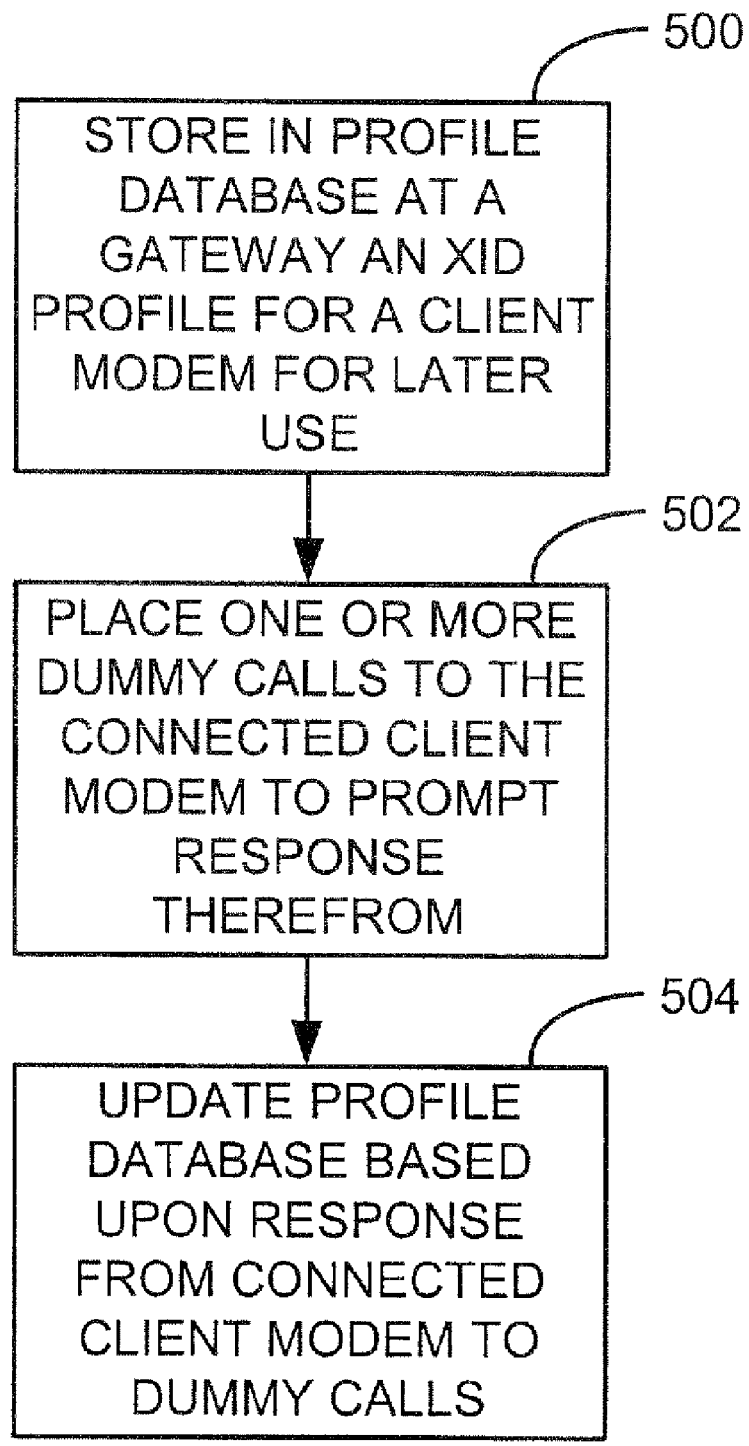
FIG. 5 is a flowchart of the invented method in accordance with yet another preferred embodiment of the invention.

FIG. 5 is a flowchart illustrating yet another preferred embodiment of the invented method. At 500, an XID profile for a client modem is stored in a profile database at a gateway. At 502, one or more dummy calls is placed to the connected client modem to prompt one or more informative responses therefrom. At 504, the stored profile for the client modem optionally may be updated based upon the connected client modem's response to the one or more dummy calls. This is described in more detail above, and may be understood by those of skill in the art to involve a learning mode by which a prediction is made and then validated in order to obtain substantially optimal MR performance over time and with various and potentially variable servers, gateways, modems and line conditions.

The numerous advantages of the invention now may be appreciated. The invented method and apparatus provide:
  Optimal XID compression settings.
  Improved Call Success Rate (CSR) due to compatible compression settings.
  Decreased time to connect.
  No need to delay the physical connection.
  Less complexity in the modem relay connection state machine.
  Fewer call failures due to systematic problems.
  Extensible to MNP (LR compression settings).
  Extensible to protocol choice (V.42; MNP; V.14) and V.14 parameters.

Further Considerations

The ITU-T V.42 recommendation teaches that M1 should send an XIDc (XID command) frame during the protocol establishment phase of a V.42 connection and should expect an XIDr (XID Reply) frame in return. The XIDc contains the complete and maximal LAPM (Link Access Protocol for Modems) and data compression capabilities of the originating modem, e.g. for M1:
  V.42bis (both directions, Dictionary=2K; MaxString=255),
  V.44 (both directions, TxDictionary=4K; TxMaxString=250,
  TxHistory=6K; RxDictionary=5K; RxMaxString=255; RxHistory=6K).

M2 selects a feasible set of items from this "menu", negotiating them "down" to what it supports, but maximizing compression performance within those limits, and returns them as its XIDr. For example, suppose that M2 can support:
  V.42bis or V.44, Dictionaries=3K; Histories=7K; Strings=250/255, preference for V.44.
  In this case, the XIDr sent by M2 would contain the following:
  V.44 compression, TxDictionary=RxDictionary=3K,
    TxMaxString=RxMaxString=255;
  TxHistory=RxHistory=6K.

Assume XIDp (not sent as such) is a "profile" or "menu" of a modem's capabilities. The profile may contain mutually exclusive settings, such as data compression types, since the modem can only perform, at most, a single data compression method at a time. For M1 (originating), note that XIDp[M1] is completely represented by XIDc[M1]. For M2 (answering, terminating), however, note that XIDp[M2] cannot be determined from a single instance of XIDr[M2], and the priority between mutually exclusive items such as compression types is unknown.

MR1 XID negotiation between M1 and M2 over a V.MoIP Modem Relay network is ideally end-to-end, since this gives the most feasible negotiation result, and the resulting negotiated parameters are the best that can be achieved (as good as a direct connection between the two modems). The originating (calling) modem M1 proposes a profile of its maximum acceptable capabilities in its XIDc[M1], and the terminating (called) modem M2 returns the maximal/preferred/supported subset in its returned XIDr[M2]. If M2's capabilities are XIDp[M2], then XIDr[M1]=XIDr[M2]=XIDc[M1]∩XIDp[M2], where "∩" symbolizes the V.42 negotiation function (similar to a logical intersection or the Boolean AND operator). This preserves the general rules that XIDr<=XIDc and XIDr≦XIDp, where "≦" symbolizes the "properly negotiates down to" relation.

End-to-end negotiation may not be possible in some Modem Relay scenarios.

These are situations where M1's XIDc cannot reach M2 by the time it is required by the TGW-M2 LAPM session, or where M2's XIDr cannot reach M1 by the time it is required by the M1-OGW LAPM session. These scenarios would normally result in default compression parameters being negotiated, or in a failed call (due to incompatible parameters).

If the modems were simply to wait for the respective XID command/response to arrive, LAPM protocol timeouts might have already caused the call to fail. Such delays could be due to differences in train-up time between the M1 and M2 connections (e.g. by the time M1 reaches XID phase, M2 has reached its XID phase and then timed out). Another cause of such delays could be pure end-to-end delay across the V.MoIP network.

A popular workaround for this XID timing problem is to use minimal defaults for both the XIDr sent to M1 and the XIDc sent to M2. For example, using the modem settings of the example above, one could choose a default XIDd of V.42bis (both, Dictionary=1 k; MaxString=32). Whenever M1 sends its XIDc, OGW would immediately send to M1 the default response XIDr=XIDd=V.42bis (both, 1 k, 32). When TGW reaches XID phase with M2, TGW immediately sends XIDc=XIDd=V.42bis (both, 1K; 32), and M2 would hopefully send XIDr=XIDd=XIDp[M2] & XIDd, confirming these parameters.

This XIDd workaround has two problems:
1) Negotiation can fail. If M1 requests (via its XIDc) or M2 accepts (via its XIDr) a narrower set of parameters than the XIDd default (e.g. M1 requests no compression), the result is different parameters negotiated for M1 and M2, so the two will not be able to communicate successfully. The call will fail, initially or eventually.
2) Sub-optimal parameters can result. V.44 compression would have been a better compression in the above example. Larger dictionary and string sizes would have been better. However, if a wider XIDd had been used, more modems would be found that used a narrower set, and negotiation would fail.

Another popular workaround is for gateways to implement additional physical layer intelligent code to delay physical layer bring-up on the faster side. There is a high risk of incompatibility here, and it is impossible to predict all the delays (e.g. a retrain or speed-shift may occur in the middle of the XID phase).

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method for end-to-end prediction of compression parameters over a modem relay network connection between an originating modem and a terminating modem and associated originating and terminating gateways, the method comprising:
   storing at an originating gateway a predictive exchange identification (XID) profile for the originating modem;
   transmitting the stored predictive XID profile for the originating modem to the terminating gateway before completion of a physical layer negotiation between the originating gateway and the originating modem; and
   receiving at the originating gateway a predictive XID profile for the terminating modem from the terminating gateway before completion of the physical layer negotiation between the originating gateway and the originating modem.

2. The method of claim 1 which further comprises:
   storing at the terminating gateway a predictive XID profile for the terminating modem; and
   receiving the stored predictive XID profile for the terminating modem to at the originating gateway.

3. The method of claim 2, wherein the stored predictive XID profile for the terminating modem is based upon prior actual XID data for the terminating modem.

4. The method of claim 1, wherein the stored predictive XID profile for the originating modem is based upon prior actual XID data for the originating modem.

5. The method according to claim 1 further comprising placing at least one dummy call with the originating gateway to the originating modem to prompt a response identifying compression parameters for a given compression protocol.

6. The method according to claim 1 further comprising predicting with the originating gateway the predictive XID profile for the originating modem and receiving from the terminating gateway a prediction of an XID response by the terminating modem.

7. The method according to claim 1 further comprising receiving the predictive XID profile from the terminating gateway even if the terminating gateway has not yet received an XID profile from the terminating modem.

8. A computer readable storage medium encoded therein a computer executable program for decoupling the exchange identification (XID) phases of two modem gateway legs of a modem relay (MR) connection, the program when executed operable to:
   maintain in a first gateway a first exchange identification (XID) profile of an associated modem for a first modem-gateway leg of a modem relay (MR) connection;
   transfer the first XID profile to a second gateway in a second modem-gateway leg of the MR connection before a physical layer negotiation is completed between the first gateway and its associated modem on the first modem-gateway leg of the MR connection;
   receive a second XID profile from the second gateway for an associated modem for the second modem-gateway leg of the MR connection before the physical layer negotiation is completed between the first gateway and its associated modem on the first modem-gateway leg; and
   confirm the compatibility of the first XID profile with the second XID profile.

9. The computer readable storage medium in accordance with claim 8, further operable to:
   transmit a compatible XID from the first gateway to the second gateway after the physical layer negotiation at the first gateway is complete; and
   complete XID negotiation between the first and second modem-gateway legs of the MR connection by receiving at the first gateway a validated XID from the second gateway.

10. The computer readable storage medium in accordance with claim 9, further operable to exchange the first and second XID profiles using out-of-band inter-gateway messaging.

11. The computer readable storage medium in accordance with claim 9, further operable to exchange the first and second XID profiles using in-band inter-gateway messaging.

12. A network processing device for end-to-end prediction of compression parameters over a modem relay network, comprising:
   a first gateway configured to:
   store a first predictive exchange identification (XID) profile for a first modem;
   receive a second predictive XID profile from a second gateway for a second modem; and
   transmit the first predictive XID profile for the first modem to the second gateway even when the first gateway has not received an XID profile from the first modem.

13. The network processing device of claim 12 wherein the first predictive XID profile is determined by the first gateway by sending dummy calls to the first modem.

14. The network processing device of claim 12 wherein the second predictive XID profile for the second modem is based upon prior actual XID data for the second modem.

15. The network processing device of claim 12 wherein the first gateway is further configured to receive the second predictive XID profile from the second gateway and transmit the first predictive XID profile to the second gateway before completing a physical layer negotiation with the first modem.

16. A system, comprising:
   means for storing a first exchange identification (XID) profile in a first gateway for a first modem in a first modem-gateway leg of a modem relay MR connection;
   means for receiving a second XID profile from a second gateway for a second modem in a second modem-gateway leg of the MR connection; and
   means for sending the first XID profile for the first modem in the first modem-gateway leg to the second gateway even when the first gateway has not yet received an XID profile from the first modem.

17. The system according to claim 16 further comprising means for completing an XID negotiation with the second gateway by receiving a validated XID profile from the second gateway.

18. The system according to claim 16 further comprising means for sending the first XID profile to the second gateway and receiving the second XID profile from the second gateway using out-of-band inter-gateway messaging.

19. The system according to claim 16, further comprising means for generating the first XID profile by sending dummy calls from the first gateway to the first modem.

* * * * *